US008041752B2

(12) United States Patent
Petrank et al.

(10) Patent No.: US 8,041,752 B2
(45) Date of Patent: Oct. 18, 2011

(54) CONCURRENT, LOCK-FREE OBJECT COPYING

(75) Inventors: Erez Petrank, Redmond, WA (US);
Filip Jerzy Pizlo, Indianapolis, IN (US);
Bjarne Steensgaard, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/731,018

(22) Filed: Mar. 24, 2010

(65) Prior Publication Data
US 2010/0179971 A1    Jul. 15, 2010

Related U.S. Application Data

(62) Division of application No. 11/801,039, filed on May 8, 2007, now Pat. No. 7,716,192.

(51) Int. Cl.
*G06F 12/00* (2006.01)
*G06F 17/30* (2006.01)

(52) U.S. Cl. ........ 707/813; 707/816; 707/820; 711/108; 711/170; 711/171

(58) Field of Classification Search .................. 707/813, 707/816, 820, 695; 711/108, 170–171
See application file for complete search history.

(56) References Cited

U.S. PATENT DOCUMENTS

| | | | |
|---|---|---|---|
| 5,088,036 A | | 2/1992 | Ellis et al. |
| 5,170,480 A | * | 12/1992 | Mohan et al. ................. 711/115 |
| 6,098,080 A | | 8/2000 | Endicott et al. |
| 6,192,517 B1 | | 2/2001 | Agesen et al. |
| 6,247,025 B1 | | 6/2001 | Bacon |
| 6,430,580 B1 | * | 8/2002 | Azagury et al. ....... 707/999.206 |
| 6,502,111 B1 | | 12/2002 | Dussud |
| 6,567,905 B2 | | 5/2003 | Otis |
| 6,671,707 B1 | * | 12/2003 | Hudson et al. ......... 707/999.206 |
| 6,721,865 B2 | | 4/2004 | Lewis |
| 6,826,583 B1 | | 11/2004 | Flood et al. |
| 6,845,385 B1 | | 1/2005 | Hennessey |
| 7,062,519 B2 | | 6/2006 | Garthwaite |
| 7,136,887 B2 | * | 11/2006 | Garthwaite et al. .......... 707/813 |
| 7,174,354 B2 | | 2/2007 | Andreasson |
| 7,328,316 B2 | * | 2/2008 | Moir et al. .................... 711/150 |
| 7,529,752 B2 | | 5/2009 | Hinshaw et al. |
| 2001/0047361 A1 | | 11/2001 | Martin et al. |

(Continued)

OTHER PUBLICATIONS

Appel et al.—"Real-Time Concurrent Collection on Stock Multiprocessors"—Proceedings of the ACM SIGPLAN 1988 conference on Progamming Language Design and Implementation—vol. 23, Issue 7, Jul. 1988 (pp. 11-20).*

(Continued)

*Primary Examiner* — John E Breene
*Assistant Examiner* — Anh Ly

(57) ABSTRACT

Described is a technology by which a real-time data relocating mechanism is provided for multiprocessing environments, including supporting lock-free programs that run in parallel. The relocating mechanism moves an object by using a status field related to the data field, possibly in an interim (wide) object space, which is then copied to a to-space object. The status information for each data field of the original object contains information indicating where a current version of the data for each field is present, that is, in the original, wide or to-space object. In one example, a handshake mechanism of a garbage collector establishes preparation and copy phases between the mechanism and other threads that determine where memory accesses occur. Also described is support for program thread compare-and-swap (CAS) operations and/or multi-word atomic operations.

10 Claims, 8 Drawing Sheets

U.S. PATENT DOCUMENTS

| | | | |
|---|---|---|---|
| 2001/0056420 | A1 | 12/2001 | Steele, Jr. et al. |
| 2003/0217058 | A1 | 11/2003 | Ladan-Mozes et al. |
| 2004/0015642 | A1* | 1/2004 | Moir et al. ............. 711/1 |
| 2004/0034673 | A1 | 2/2004 | Moir et al. |
| 2004/0122874 | A1 | 6/2004 | Garthwaite |
| 2005/0071335 | A1 | 3/2005 | Kadatch |
| 2005/0132374 | A1* | 6/2005 | Flood et al. ............ 718/100 |
| 2006/0037026 | A1 | 2/2006 | Doherty et al. |
| 2006/0173885 | A1* | 8/2006 | Moir et al. ............. 707/101 |
| 2008/0163220 | A1* | 7/2008 | Wang et al. ............ 718/101 |
| 2008/0183958 | A1 | 7/2008 | Cheriton |
| 2008/0228784 | A1* | 9/2008 | Dempsey ............... 707/100 |
| 2010/0262636 | A1* | 10/2010 | Bacon et al. ........... 707/813 |

OTHER PUBLICATIONS

Anderson et al.—"Lock-Free Transactions for Realtime Systems"—Series in Engineering, 1997—NSF contract CCR 9216421, Intel and IBM (pp. 1-8).*

Gao, H. et al.; "Lock-free Parallel Garbage Collection by Mark &Sweep"; Technische Universiteit Eindhoven, The Netherlands; 2004; pp. 1-38.

Huelsbergen, Lorenz et al.; "A Concurrent Copying Garbage Collector for Languages that Distinguish (Im)mutable Data"; ACM Press, New York, USA; 1993; pp. 73-82.

Michael, Maged M.; "Safe Memory Reclamation for Dynamic Lock-Free Objects Using Atomic Reads and Writes"; IBM Thomas J. Watson Research Centre, P.O. Box 218, Yorktown Heights, NY 10598 USA; Jul. 21-24, 2002; pp. 1-10.

Fraser, Kair; "Practical Lock-freedom"; University of Cambridge; Feb. 2004; pp. 1-116.

Ram, et al.; "Parallel garbage collection without synchronization overhead"; ACM SIGARCH Computer Architecture News; vol. 13, Issue 3; Proceedings of the 12th Annual International Symposium on Computer Architecture (ISCA '85); Jun. 1985; pp. 84-90.

Herlihy, Maurice et al.; "Nonblocking Memory Management Support for Dynamic-Sized Data Structures"; ACM Transactions on Computer Systems; vol. 23, No. 2; May 2005; pp. 146-196.

* cited by examiner

CONCURRENT, LOCK-FREE OBJECT COPYING

PRIORITY

This application is a divisional of, and claims priority from, U.S. application Ser. No. 11/801,039, filed on May 8, 2007, now U.S. Pat. No. 7,716,192 B2, which is incorporated by reference in its entirety.

BACKGROUND

Garbage collection refers to a type of automatic memory management found in many modern programming languages, including C#, Java, ML and Lisp. If the garbage collection does not include copying of program objects from one location in memory to another location in memory, long-running programs are likely to suffer from a phenomenon known as "memory fragmentation." Memory fragmentation leads to unnecessarily large memory requirements by programs, whereby programs may run slower or may eventually fail due to running out of available memory. Copying garbage collection counteracts memory fragmentation by copying program objects for the purposes of packing them closer together in memory. As a result, long-running programs such as operating systems, operating system components, and server applications may be saved from running out of available memory.

A large number of garbage collection techniques are in existence. One family of garbage collection techniques generally operates concurrently with the execution of the program whose memory is being reclaimed, and is referred to as concurrent garbage collection. However, existing garbage collectors for multiprocessor environments suffer from at least one of several problems.

One problem is that some garbage collectors employ what is known as a stop-the-world phase, which has a number of drawbacks. More particularly, in the stop-the-world phase, program execution is stopped for the purposes of doing part or all the work of garbage collection. Among other aspects, stopping program execution prevents the programs from modifying memory, which may include the memory allocated to the objects being processed for garbage collection. The duration that program execution is stopped is known as "pause time." Pause times degrade the user experience of a program, e.g., a pause time of a tenth of a second could cause the loss of two-to-three frames of video replay and a very noticeable pause in an audio signal.

To obtain short pause times, incremental or concurrent collectors have been developed. However, previous collectors suffer from one of the following drawbacks. Either they employ a stop-the-world phase, which hinder high-responsiveness; or they do not relocate objects, which leads to fragmentation in the long run; or they restrict support to a uniprocessor; or they do not support atomic operations, required to synchronize lock-free (non-blocking) algorithms, or they impose unsustainable overheads on memory usage and/or efficiency, or they impose unrealistic constraints on the behavior of user programs (e.g., violate the language semantics), or they impose unsustainable overheads on memory usage, or they rely on the processor having instructions not found in many commonly used machine architectures (e.g., not supported by the Intel x86 or x64 architectures).

In sum, stop-the-world garbage collectors are not acceptable for many applications. At the same time, known real-time highly-responsive collectors restrict real-time guarantees to uni-processor environments only, rely on special hardware, or suffer from one of the drawbacks mentioned above.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology that provides a real-time data relocating mechanism for multiprocessing environments, including supporting lock-free programs that run in parallel. Objects are incrementally (e.g., a field at a time) copied in a way that allows for mutator threads to access and modify partially copied objects.

In one example, the relocating mechanism works as a compaction mechanism of a lock-free partially-compacting concurrent garbage collection mechanism. The garbage collection mechanism compacts objects by (possibly) using an interim (e.g., wide) object that includes status information for each field by which threads know where a current version of the data for each field is present. Also described (in example implementations) is support for program thread compare-and-swap operations and/or double-word atomic operations.

In one example, a handshake mechanism (e.g., of the garbage collector) establishes idle, preparation or copy phases between the mechanism and other threads. The compaction mechanism copies fields of an original object to a wide object during the copy phase, while allowing each other thread to access the original object or wide object for reading fields of the object. The original object includes a pointer to the wide object, and each field of the wide object is associated with a status that indicates whether the original or wide object contains a current version of the data. The transition from the preparation phase to the copy phase does not happen atomically for all threads, so threads that are under the impression that the current phase is the preparation phase must be prepared to deal with objects for which the object copying process has commenced.

When each of the other threads is in the copy phase, the compaction mechanism copies fields from the wide object to a to-space object. At the same time, each other thread may access the wide object or the to-space object for reading fields of the object. The wide object includes a pointer to the to-space object, and the each status associated with each field of the wide object indicates whether the wide object or to-space object contains the current version of the data. When the copy to the to-space object is complete, the original object is changed to have a forwarding pointer to the to-space object.

While in the copy phase, a thread atomically writes data to a field in the wide object along with a status value in the associated status field to indicate that the current version of the data is in the wide object. Later in the copy phase, the compaction mechanism transfers the data to a data field in the to-space object, which occurs atomically with a write to the status field in the wide object to indicate that the current version of the data is in the to-space object. Once the compaction mechanism has transferred representation of the field from the wide object to the to-space object, the mutator threads may access that field of the to-space object (as it would access any other field in an object that is not being moved).

Write operations as well as compare and swap operations during the preparation phase are facilitated via a count (taint count) that indicates to other threads when an object-modifying operation is in progress. When the count has a non-default value (typically a non-zero value), a modifying operation may be ongoing on the from-space object, and field representation may not be transferred from the from-space object to the wide object.

Double-word atomic writes on fields represented by a wide object are facilitated by an action item that includes information for sequentially writing a double-word to two separate data fields; the action item only completes when no change to a field occurs between separate writes of each word to its corresponding field.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology, implemented in a garbage collection mechanism, which supports copying of program objects from one memory location to another memory location, without stopping program execution and while allowing preservation of the program semantics of commonly used languages such as C# and Java. The mechanism only uses instructions found in commonly used machine architectures.

The mechanism associates an object with one or more indicators. The indicators reflect which parts of an object have been copied from a source set of memory locations to a destination set of memory locations. A partially copied object may be accessed by using the indicators to determine which memory locations should be treated as representing the object state.

As will be understood, the mechanism may copy program objects with the aid of auxiliary objects, referred to herein as "wide" objects because they include additional information (e.g., status fields) not provided in the original object. In general, the auxiliary objects are only used during a copying phase for the objects that are to be copied.

As will be understood, the copying technology is independent of any particular garbage collection algorithm. The mechanism can be used in conjunction with many different garbage collections algorithms, including concurrent mark-sweep garbage collectors, incremental mark-sweep collectors, and stop-the-world mark-sweep collectors. Moreover, the copying technology is independent of strategies for selecting which objects to copy and which objects to not copy. The mechanism can be used to implement mostly-copying as well as mostly-non-copying object compaction strategies. The mechanism can also be used in conjunction with algorithms other than garbage collection algorithms, including algorithms to compact or relocate memory and algorithms to improve program behavior by changing the location of objects.

As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used in various ways that provide benefits and advantages in computing, memory management and/or object copying technology in general.

Figure 1:
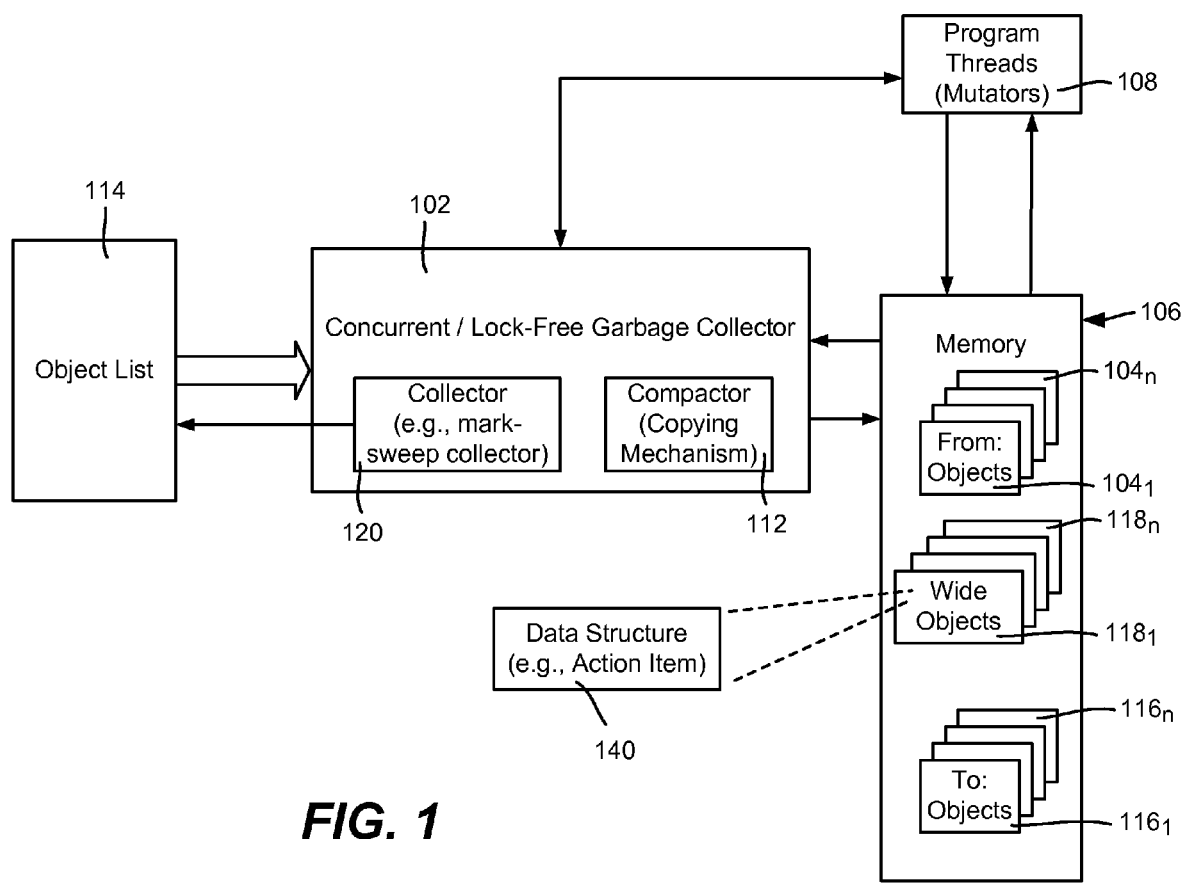
FIG. 1 is a block diagram representing an example system for garbage collection including by copying to intermediate fields (wide objects).

Turning to FIG. 1, there is shown an example of a concurrent, lock-free garbage collection mechanism 102 that operates on objects $104_1$-$104_n$ in memory space 106. The objects $104_1$-$104_n$ may be some set or subset of those used by program (e.g., application program) threads 108. As will be understood, the garbage collection mechanism 102 comprises a copying mechanism referred to herein as a compactor 112 that copies specified objects ("from" objects) $104_1$-$104_n$ in a list or the like 114 to new copies of those objects ("to" objects) $116_1$-$116_n$ possibly through the use of temporary intermediate objects referred to as "wide" objects $118_1$-$118_n$.

In one example implementation, the lock-free concurrent compactor (copying mechanism) 112 may be implemented in or otherwise associated with a concurrent mark-sweep garbage collector 120 that provides garbage collection support for real-time multithreaded programs running on multiprocessors. However, as mentioned above, the compactor 112 may be used with other types of garbage collectors and algorithms other than garbage collectors.

As represented in the example of FIG. 1, the garbage collector 102 thus comprises a mark-sweep collector 120 for reclaiming unreachable objects and the compactor 112 for controlling fragmentation for long-running programs. In this example, the concurrent mark-sweep collector 120 is run first to reclaim unreachable objects. When fragmentation appears, the compactor 112 is run thereafter to reduce fragmentation. In this example, the decision of which objects to mark as causing memory fragmentation/identify in the object list 114 may be performed by the sweep procedure of the mark-sweep collector 120. An example of a suitable collector is known as the Doligez-Leroy-Gonthier (DLG) collector.

Virtually any mechanism may be used to select objects for compacting. For example, the garbage collector 102 may use a heuristic for moving objects, such as to evacuate objects from pages that contain less than some predetermined percent threshold occupancy; space for moving these objects is created by use of the allocator. More sophisticated strategies may be employed to select objects for compacting.

As can be readily appreciated, there are numerous alternatives for implementing such a collection/compaction system.

In one example implementation, a responsive system is provided by running threads of the collector 102 concurrently with the program threads 108, giving them each designated processors. However, if the number of processors is small and a processor cannot be designated for garbage collection, then for example, the concurrent lock-free garbage collector 102 may be run on a time-based scheduling scheme, such as on each processor together with each application thread. Guidelines are known for computing the CPU time ratio that should be provided for use of the collector given user prediction on allocation rate. When the number of processors is large, then similar considerations may be used to provide the concurrent lock-free garbage collector 102 with more processors, so that it is able to cope with several concurrent application threads.

The compactor 112 comprises a non-intrusive, concurrent copying mechanism that allows moving of objects concurrently with the running of the program threads 108, providing high responsiveness and maintaining the program's or programs' lock freedom. The compactor mechanism 112 may be incorporated into a full compaction algorithm, such as the known Compressor, to compact the entire heap and eliminate fragmentation, or it may be used with any on-the-fly mark and sweep collector to perform partial compaction in order to reduce fragmentation. The overhead of the compactor 112 increases with the number of objects to be moved, because its overhead is higher during the move.

When an object is to be moved by the compactor 112, it is tagged previous to the running of the compactor (e.g., by the sweep procedure of the collector 120) by setting a bit in that object's header and adding it to the object list 114 accessible to the compactor 112. As can be readily appreciated, creating a copy of the original object and making the program switch to working with the new object instead of the original one, keeping lock freedom, maintaining acceptable memory coherence, and reducing the overheads to an acceptable measure is nontrivial.

For example, consider two threads trying to concurrently modify a field f, which originally holds the value 0, and each thread first writes the new field value to the original object and subsequently writes the new field value to an object copy. Thread T1 tries to write the value 1 into f and Thread T2 tries to write the value 2. Although they attempt to write to the field concurrently, one of the writes will happen before the other. If thread T1 writes first, a third thread that reads this field may see the field value going from 0 to 1, and then into 2. However, threads T1 and T2 next attempt to write concurrently to the replica, which may possibly happen in a different order, whereby 1 would be the value that prevails in the replica. Thus, a third thread that reads the field in the original location and then in the copied location, may observe the sequence of values 0; 1; 2; 1 in the field f, which is not allowable in any reasonable memory model.

As a result, previous solutions employed locking, hardware memory protection or assumed that there were no concurrent (non-blocking) writes to a memory location. For example, in some prior systems, once all objects have an updated replica, such a copying phase terminates by stopping all program threads and modifying their root set pointers to point to the copied objects. A significant problem with this solution is that the two copies of an object are not guaranteed to contain the same information, unless proper locking mechanisms are introduced. However, non-blocking concurrent accesses are needed for any lock-free real-time algorithm.

Another problem is that the threads are all halted simultaneously to shift from the original copy to the replica. This also involves some undesirable locking mechanism, making it possible for one slow thread to block others. If the threads are not stopped simultaneously, then they may be in different stages, e.g., where some of them are still reading the old replica while others are not writing to it anymore. Various other hazardous race conditions exist.

The compactor 112 described herein does not need to stop the threads simultaneously, nor rely on locking to get the replicas coherent. Instead, the compactor that copies objects as described herein employs read-barriers and write-barriers, (which have cost, but which may be almost eliminated entirely when the compactor is idle). As described below, during object copying, a temporary wide object is created to represent an object to be copied. A forwarding pointer is kept in each old object pointing to the wide object, and later to a new copy of the object.

Figure 2:
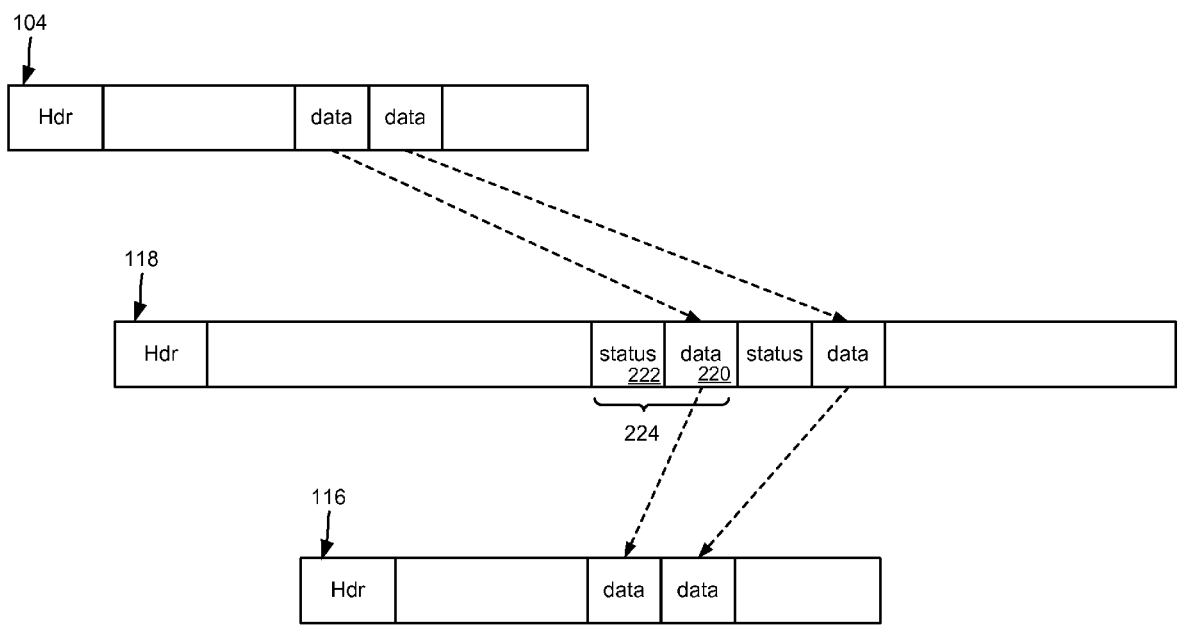
FIG. 2 is a representation of an example wide object and resultant to-space object, the wide object including data and status fields corresponding to original object fields.

More particularly, as represented in FIG. 2, a first step of copying an object is to create an uninitialized wide version 118 of the object. Note that although FIG. 2 shows the wide version 118 as being a separate contiguous block with respect to the original ("from") object 104 and/or the new ("to") object 116, it is understood that the wide version may be in any space in the memory, not necessarily contiguous space, and indeed may be partially in the original object's space and/or in the new object's space as long as the copying is arranged (ordered) such that no needed object data is overwritten.

In the wide object 118, each object's data field (e.g., 220) is juxtaposed with or otherwise associated with a status field (e.g., 222). At any time, the status field informs the program threads which object's field has the current version of the associated payload. The read and write barriers consult the status field to identify the representative memory location containing the field value and accordingly which action to perform. Whenever modified, the wide field 224 comprising the associated status field 222 and the original field 220 are atomically modified using a compare-and-swap operation.

In one implementation, the wide fields are at most twice the size of the processor word. For example, on a 32-bit architecture, the largest wide field would have 32-bit status fields and 32-bit payloads, (where 'payload' refers to object fields that are not added by the compactor such as the status fields in the wide object or the forwarding pointer field), thus allowing a 64-bit compare-and-swap to be used. Note that such a double-word compare-and-swap is available on most modern instruction set architectures.

If the original field is already twice the processor word size (such as a 64-bit field on a 32-bit processor), the field may be first split into two 32-bit halves. The copying of objects to be moved and access to those objects by mutators is described below. The mechanism uses double-word atomic operations to ensure the proper memory semantics for program thread interactions. Further described below is an extension of the basic mechanism that allows mutators to perform other atomic operations. For example, the mechanism may allow double-word atomic compare-and-swap operations performed by the program threads, and also may use auxiliary action items to support incremental copying of objects.

An object layout used by the compactor 112 contains a special header word used as a forwarding pointer during the compaction. In one phase, the forwarding pointer is contained in the header section of the original (from) object 104 and stores a reference to the wide object 118. Later, the pointer is changed to point to the new copy of the object 116. In one example implementation, the (otherwise unused) least significant bits of the forwarding pointer are used to distinguish between pointing to the wide object and pointing to the new copy, whereby the program thread 108 and garbage collector 102 know whether status fields are present (the wide object) and need to be considered or not (the new, final copy).

In a copying phase, the compactor copies each data (payload) field from the original object 104 into the wide object 118. At the same time, a thread 108 (FIG. 1) may modify the wide object 118. Note that modifications to the original field are no longer allowed after a wide-object field has been copied.

To this end, when the status field is zero (the initial value in one example) and the initial object 104 contains the forwarding pointer to the wide object 118, any thread operating on the object 104 is directed to the wide object 118, where that thread recognizes from the zeroed status field associated with the data field that the most current value is in the original object 104. For a read operation, the original object data field is read.

For write operations, any modifications are to the wide object 118, whether by the compactor 112 copying fields into the wide object, or a thread 108 mutator modifying the wide object 118. These modifications are performed using a two-field compare-and-swap on the wide object 118, which changes the data field at the same time it changes the status field from zero to nonzero and thereby ensures that no updates are lost. For example, a mutator update cannot be lost by the collector's copy operation overwriting it, because the collector's compare-and-swap operation asserts that the status was zero when performing the copy, while the mutators compare-and-swap operation will toggle the status to be nonzero upon an update.

Once the payload is relocated to the wide object 118, a next stage of copying commences. In this stage, a final copy of the object, denoted the to-space copy, or simply the "to" object 116, is modified. The to-space object may be allocated at any time prior to its use, in particular it may be allocated at the beginning of this next phase of copying. Note that the to-space object 116 has a normal, narrow object layout, (that is, without status fields). A forwarding pointer reference to the to-space object is added to the wide object 118. At this point three versions of the object are reachable, namely the defunct original 104 that no longer is certain to contain the most up-to-date payload, the wide version 118 that may actively be accessed and modified by the mutator thread or threads 108, and the uninitialized to-space copy 116 referenced by the wide object 118. Note that in alternative implementations, it is possible to have an object's fields distributed among the original, wide object and to-space copy, that is, an object may be represented by memory locations from all three sets of memory locations.

Note that in one example implementation, only one compactor thread is used to populate the to-space object copy 116. This single copying permission avoids problematic races during the final copying. Fields are copied by reading the field and associated status from the wide object 118, writing the field value into a corresponding data field in the copy 118, and using a compare-and-swap on the status and payload field in the wide object 118, changing the status to indicate that the payload has been placed in the to-space copy 116. Note that in one example implementation, the fields are copied in pairs rather than one at a time, which supports the ability for mutator threads to perform logical double-word compare-and-swap operations, as described below. The compare-and-swap simultaneously asserts that the value of the field has not changed, thus ensuring that no updates are lost. If the compare-and-swap fails, the compactor 112 attempts the procedure again.

To summarize, data in the original "From" objects moves to the "Wide" object, where each data word is paired up with a status word. The data in the wide object subsequently moves to a "To" object to complete the object field relocation operation. It is only after the status is changed that the mutator can begin accessing this field in the to-space copy. Object copying completes when all fields are relocated to the to-space copy. At this point the forwarding pointer in the from-space original is re-directed to the to-space copy, thus rendering the wide object unreachable.

From this point forward in the object copying process, the from-space object serves as a reference to the to-space object. Controlling consistency is straightforward at this point because although two copies exist, it is well known via the pointer which one is more up-to-date. Note that in one implementation, the mark-sweep collector 120 may finish updating pointers to the relocated objects. Alternatively, an additional final stage can be added to let the compactor 112 explicitly and concurrently fix pointers.

Figure 3:
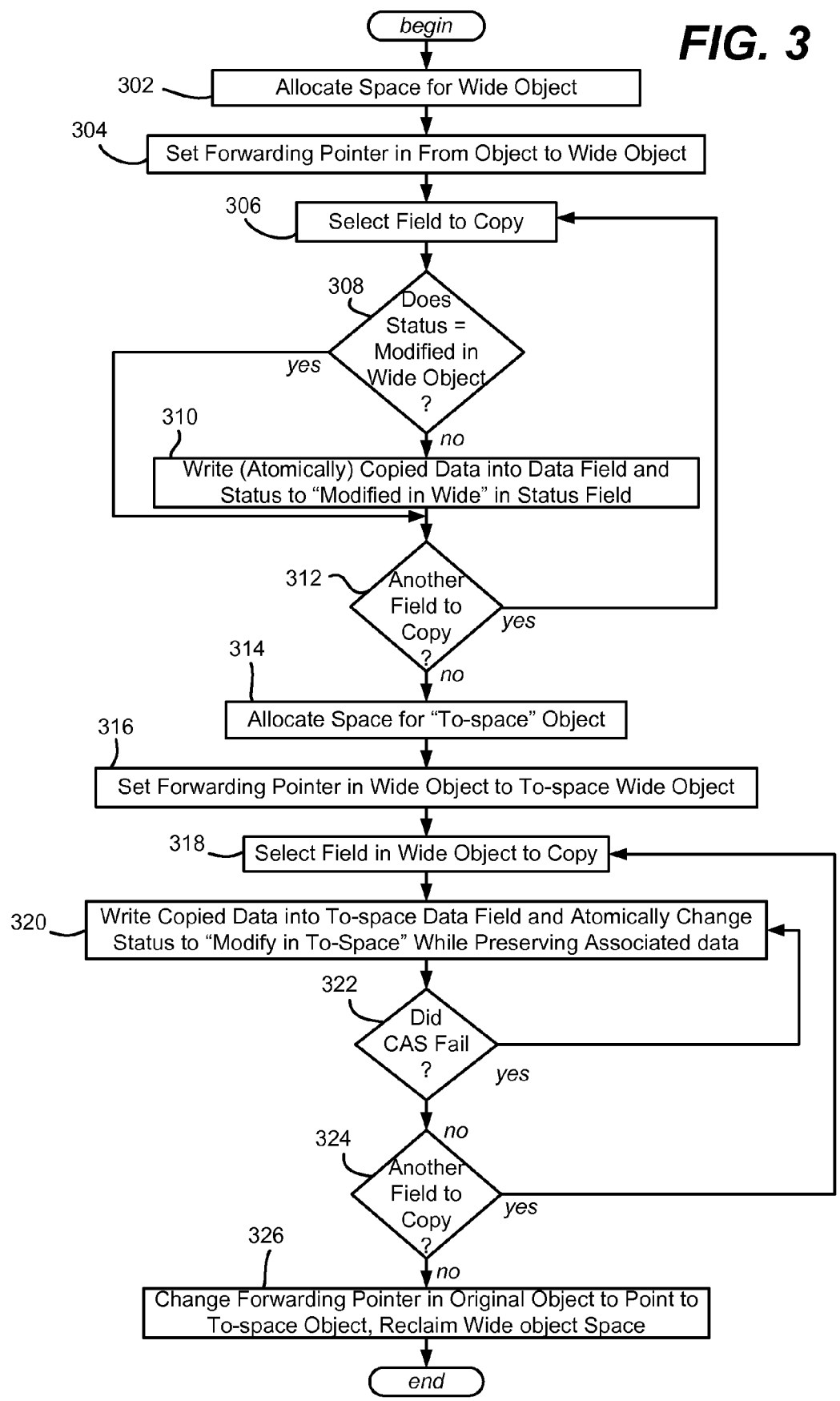
FIG. 3 is a flow diagram representing simplified example steps performed by a compactor thread copying an object.
Figure 4:
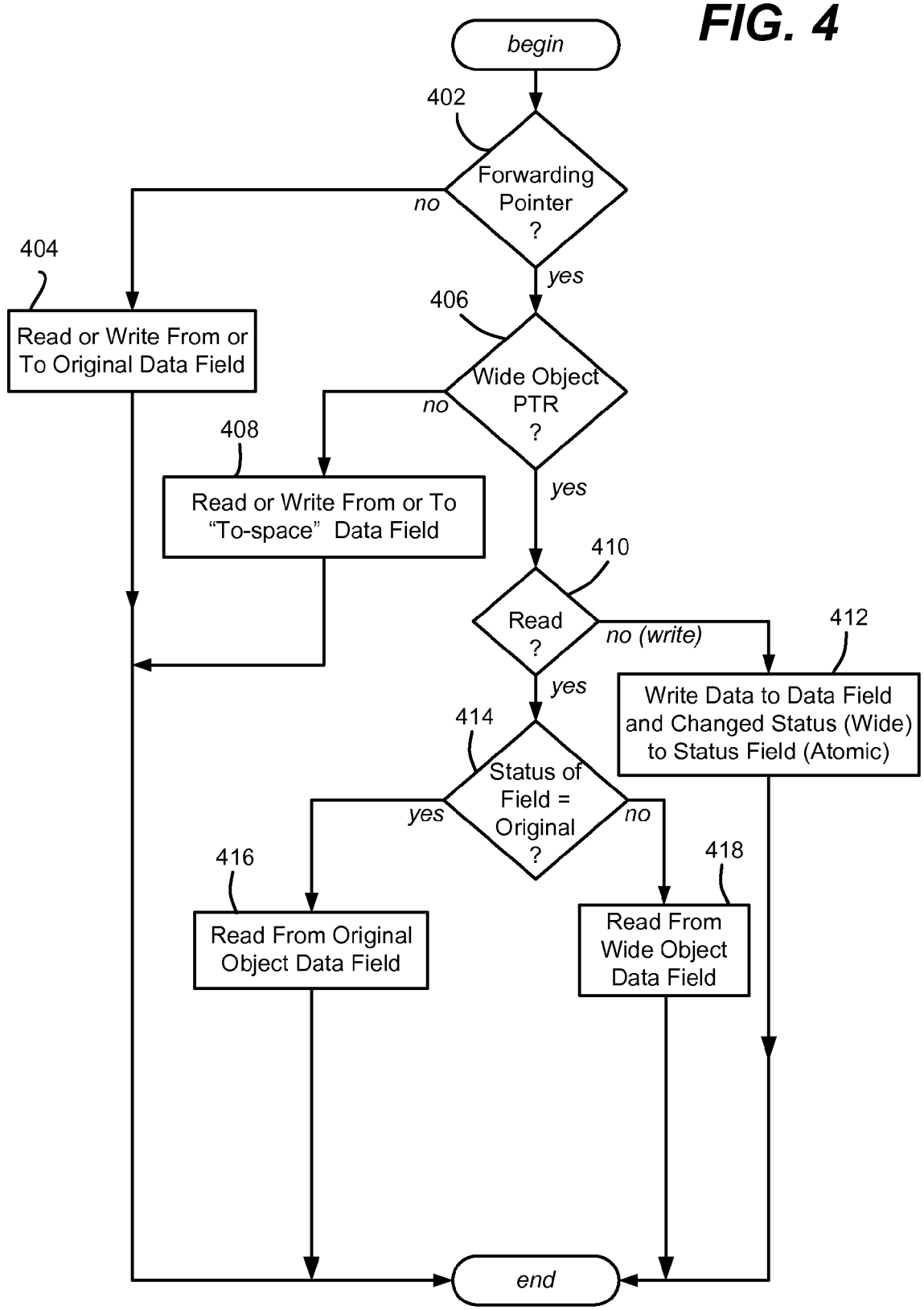
FIG. 4 is a flow diagram representing simplified example steps performed by a thread reading or writing an object field.

FIGS. 3 and 4 summarize the operation of the compactor thread and any program thread in a simplified example set of steps. Note that these simplified versions are only presented for purposes of simplified explanation, and are not intended to be entirely accurate nor intended for use in a real system.

Step 302 of FIG. 3 represents allocating space for the wide object, while step 304 represents inserting the forwarding pointer in the from-space object to the wide object. Note that the forwarding pointer has a status (e.g., its lower bits) indicating that it is pointing to a wide object, so that threads know to check the status, described below. It should be noted that any thread may allocate the wide object and/or insert a forwarding pointer to the wide object into it. Step 306 selects a field to copy.

At step 308, an evaluation is made as to whether the field should be copied or not. More particularly, a program thread may have already followed the forwarding pointer and written to this field in the wide object. In such an event, (described below with reference to FIG. 4), the status field associated with the data field would indicate the change. Note that any write to the data field and status field occur atomically, (e.g., via a double-word atomic operation), and thus there is not a situation in which the data could be written to the wide object field without the status also indicating the change.

If the field indicates the change at step 308, then the data field should not be overwritten by the original data field, whereby step 308 branches to step 312. Otherwise, if not yet changed in the wide object, at step 310 the original field is copied to the wide object atomically with the status change in its associated status field to indicate that the valid data is now in the wide object. Via the status, program threads will now know to read this field's data from the wide object, not the original object. Note that when a forwarding pointer is present and actively to be followed, writes always follow the forwarding pointer (to the wide object in this example).

Step 312 repeats the process (the copying or bypassing the copying if already changed by another thread) for other fields of the object. In this simplified example, because the status associated with each field is updated as a field is written (including when copied), the status thereby indicates to each reader thread whether to read from the original object.

To copy the fields from the wide object to the "to-space" object and thereby complete the compaction, step 314 represents allocating the "to-space" object. Step 316 represents the setting of a forwarding pointer in the wide object to point to the "to-space" object, along with a status indicating the to-space object is not a wide object (that is, it does not have associated status fields). Step 318 selects a field to copy.

Step 320 performs the copy followed by a compare-and-swap (CAS) operation that attempts to change the status field to indicate the to-space object should now be used for reads for this data field. In essence, and as described below, this operation fails if the wide object's status field (and presumably the data field) is changed by another thread's write operation before it completes. If the CAS operation fails, step 322 repeats the copy attempt, using the changed data that caused the failure, until it succeeds. Step 324 repeats the process until all fields are successfully copied into the "to-space" object. Any time thereafter, in step 326 the forwarding pointer in the original object may be changed to point to the to-space object, with the space allocated for the wide object reclaimed.

FIG. 4 represents a thread's operations in this simplified example, beginning at step 402 which looks for an active forwarding pointer in the original object. If not present, step 402 branches to step 404 where a read or write occurs on the original. This is the typical case, and occurs when an object is not being compacted.

If a forwarding pointer is present, step 406 evaluates it to determine whether it is a pointer to a wide object or to another (non-wide) object, which would be the to-space object in this example. If to the to-space object, the read or write occurs at the appropriate field in the to-space object, as represented by step 408.

If a pointer to a wide object, step 410 is performed to determine whether the operation is a read or write. If a write, the data field in the wide object is written atomically in conjunction with the status field being changed to indicate that the wide object's field now contains the most up-to-date data, as represented by step 412.

If a read operation, step 414 evaluates the wide-object's status field associated with the data field to be read to determine whether to read from the original object (step 416) or the wide object (step 418).

As can be readily appreciated, the steps exemplified in FIGS. 3 and 4 were a simplified model to show the basic concepts of a wide object and to-space object using copy, read and write operations. However, a more complex model is needed to consider aspects such as whether various fields are being updated by one or more threads while other threads are in the process of following pointers, evaluating status values, and so forth.

In a more complex model, to enable lock-free copying of objects, the compactor 112 has different phases, each separated by soft handshakes. The soft handshake mechanism allows very short pauses, because threads do not need to wait for some simultaneous synchronization point. However, it also complicates the model's design because at any instant, the system may straddle two phases, that is, one or more threads may be in a previous (preparation) phase while one or more others are already in a new (copy) phase.

The default phase for the compactor 112 is idle, where no compaction is taking place. During this phase any number of (non-compacting) garbage collector cycles may be completed and any number of objects may be tagged for compaction (relocation). The idle phase is only exited to initiate object compaction. At such a time, the compactor 112 moves into the preparation phase, subsequently moves to the copy phase, and eventually returns to the idle phase.

Whether in the idle phase, the preparation phase or the copy phase, the collector 112 and the mutator thread 108 access the heap via read- and write-barriers. The copy phase only ends when every from-space object has a complete to-space variant; the mark-sweep collector 120 may be used to ensure that all (live) references in the roots and heap are forwarded to the to-space copies.

A goal of the write-barrier is to make sure that updates do not get lost between the different copies in a way that violates any reasonable memory coherence model. Standard memory models such as the linearizable memory model or the sequentially consistent memory model are examples of memory coherence models supported by the compactor 112.

As described above, objects are in their wide state when the compactor is actively copying the payload into the wide object copy 118, whereby a mutator thread needs to check the status when writing data into the object. For example, if the mutator thread were to improperly write into the original from-space copy, the write may occur after the compactor copied the old value into the wide object 118, resulting in the mutator thread's new value getting lost. Also, an uncoordinated mutator thread's improper write into the wide object 118 may be shortly overwritten by the copying execution of the compactor 112, also resulting in the mutator's value getting lost.

During the copy phase, the mutator first attempts to set up the object for copying (e.g., expand it if not already expanded). The mutator obtains a reference to the wide object (possibly by allocating it) and attempts to install it into the object's forwarding pointer; this attempt may fail harmlessly if another thread has installed the wide object first. The installation of the forwarding pointer includes a simultaneous modification of the object state (in one implementation, contained in the lower bits of the pointer) into a wide state.

At that point, the state is read again, and if it is still wide, then the write is executed via a compare-and-swap on the wide field. Namely, the current value and status of the field are read and the compare-and-swap modifies both the field's value and state, asserting the previous value and state. In one example, the field state is set to a wide status having the value inWide. In the case of a compare-and-swap failure, the write attempt may be given up or tried again, however giving up is only an option if the compare-and-swap failed because of another thread's attempt to write, not the compactor's attempt to relocate the field, or another thread's attempt to perform an atomic operation. A failure in the compare-and-swap operation above may result from the status word currently signifying that the field is in the to-space object, e.g., inCopy. If that happens, or if the status that was originally read indicates that the field is inCopy, then a write is performed to the to-space copy of the object.

Both reads and writes may assume that no wide objects are present in the idle and preparation phase. This is generally correct, but not when atomic operations are supported. More particularly, programming languages like C# and Java allow the programmer access to atomic operations like compare-and-swap, making it possible to write lock-free code in high-level code. To add support for such features without using locks, certain extensions are set forth herein. For simplicity, the examples herein will be directed towards implementing the atomic compare-and-swap (CAS) operation, as it is straightforward to write lock-free (but not always wait-free) implementations for other atomic operations such as atomic increment, and so forth in terms of an atomic compare-and-swap.

In general, the compare-and-swap operation CAS(addr, old,new) writes the value new to location addr if this location contains the value old at the time of the write. The comparison and value exchange happen atomically. The returned value is a boolean value signifying whether the comparison succeeded (and consequently the new value was written). Alternative types of compare-and-swap operations may be similarly used.

A significant problem with synchronized operations (such as a compare and swap operation) during concurrent moving of objects is that linearization of memory accesses is far more constrained. A successful compare-and-swap that modifies a value needs to see the modified value in the linearized sequence of operations, and an unsuccessful operation may need to see an unexpected value in the linearized sequence of operations. The treatment of atomic operations may be described according to the different stages of the copying.

Considering first the copy phase, similar to field write, if the object is not yet in its wide state, the object is first widened by reading the original value of the field. If the value is different from the compare-and-swap old value, the compare-and-swap returns a failure. Otherwise, the wide field and its corresponding status word are atomically written (via a compare-and-swap operation).

The old value is assumed to be zero (0) and the old status assumed is inOriginal. The compare-and-swap atomically replaces those with the new value and the inWide status. If it failed because of a status change, or if the field was already in the inWide state, the compare-and-swap is then re-executed directly on the wide field in the wide object. Similarly, if the compare-and-swap fails because the status changes into inCopy or if the field status was detected to be inCopy at the first place, then the compare-and-swap is performed directly on the to-space copy of the object and the operation is done. Note that failing due to status changes can happen at most twice, whereby the overall operation is still lock-free.

A problem that emerges as a result of not allowing simultaneous stopping of the program threads is that while some threads are executing the barriers of the copy phase, other threads may still be running the barriers of the previous (preparation) phase. By including the special preparation phase, threads in the copy phase do not have to run concurrently with threads still in the idle phase; (doing so would cause chaos from the perspective that threads have on the changing values of a given field, with little chance to linearize these different views).

In general, the preparation phase allows cooperation between threads not yet copying and threads that are already creating and using wide objects. When an application thread in the preparation phase writes to an object, it first checks if there exists a wide object. If so, then the write is done (atomically) to the wide field of the wide object. Note that a to-space copy of the object cannot exist at this time because the compactor 102 only copies the object after all threads have responded to the handshake and moved to the copy phase. If the wide object is not yet active, then the write is performed on the from-space object. However, this may create a problem. More particularly, if a copying thread is starting to work on the wide copy of the object, the write of the thread in the preparation phase would be lost, which would make it impossible to linearize the operations on this field.

To solve this problem, the writing thread sends a warning to a copying thread about being in the middle of a write by atomically changing the status of the object to a new designated value, denoted "tainted." After the write completes, the state is changed back to tagged.

Because many threads may be executing writes concurrently in the preparation phase, a counter of the tainting threads is kept, referred to as a taint count. The taint count gets incremented upon taint and decremented upon untaint; the transition back to tagged only occurs when the taint count reaches zero.

Copying threads treat a tainted object by considering the phase. In one example implementation, if a thread in the copy phase is attempting to start using the wide copy of the object and it finds that the object is tainted, the copy thread gives up on moving this object. To do that, it moves the object into its original, simple state, preventing it from being relocated. This should only happen rarely, when a simultaneous write to an object by both a thread in the preparation phase and copy thread happens. Note that alternative schemes, such as re-trying some number of times to see if an object is no longer tainted, possibly after copying other objects in the list, are alternative ways to handle a tainted object.

Reads in the preparation phase execute as do reads in the copy phase. Compare-and-swap operations in the preparation phase run similarly to writes in the preparation phase, that is, they are executed on the wide object, or use the tainting mechanism to avoid hazardous races. Note that the taint count can be stored in the forwarding pointer word; since a tainted object never moves and only has a from-space copy, the forwarding pointer does not contain any relevant value while tainted.

One example implementation also handles atomic operations on double-word fields, such as long fields in Java or C# on 32-bit architectures. Note that C# supports atomic reads, writes, and compare-and-swap on long fields no matter the architecture, so a lock-free implementation of these atomic operations may be provided.

Figure 5:
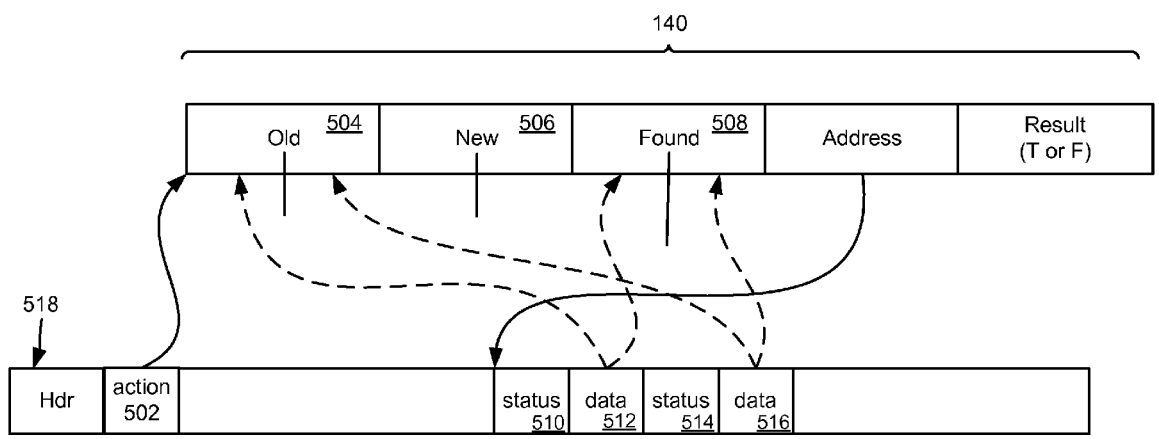
FIG. 5 is a representation of an action item corresponding to fields of a wide object that allows double-word atomic operations.

To support double-word field atomic operations, a logging mechanism data structure 140 (FIGS. 1 and 5) is provided, referred to herein as an action item. When performing a double-word atomic operation, the performing thread first allocates the action item 140 that describes the operation, and also reserves room for storing its outcome. In one example implementation, the wide object 518 may provide a field 502 for the action item 140, and only one action item is allowed at a time. In general, the action item needs to be successfully completed with the double-word sequentially written into the wide object as a whole before any word making up double-word in the wide object may be modified.

To this end, once the action item 140 is allocated with the original (old) and to-be-written (new) values in the appropriate fields 504 and 506, the action is installed by pointing to it from field 502 in the wide object. Any thread can install such a pointer. Installing the action item prevents other action items from being installed at the same time. Note that either data word to be operated on may be modified after the action item has been installed in the wide word, but before the corresponding status words have been updated.

At this time, any thread (not necessarily the one that allocated the action item) that wishes to do so can complete the action that is set forth in the action item; in fact multiple threads may be working to complete the action item simultaneously. For a CAS operation this works as follows. The threads start by cooperatively locking the wide fields so that they are not modified and reading their values into the action item; then they compare the old value to the actual value to determine if the CAS fails or succeeds and if it succeeds, then the threads write the new value into the wide object fields. Each of these operations can be done by any of the threads.

A thread starts by reading the first old value in location 510 together with the status word in location 512 and tries to atomically modify this pair of memory locations to maintain the value but modify the status word to block further modifications to this field. If this operation fails because another thread is performing a different modification of the value, then the thread tries again. The locking operation may be performed by any thread. After both wide fields are blocked from modifications, any thread may proceed by loading the field values from the wide fields into the found field space 508; all locking operations on the two wide fields are carried out in the same order, e.g., their order in the memory. Note that if more than one thread writes to the same found field, no problem occurs, as the value written into the found field is the same.

Once the values are copied into the action item, a next phase is to compare the found words in 508 with the old words in 504. Each value is compared (by any thread) and the result of the comparisons is saved in the result field.

If the comparison result is true, any thread can write the new value into the wide object, via a CAS, and simultaneously clear the status word from blocking modifications and clear the wide-object. The same thread or a different thread can perform the other word (and status) write. Finally, an action item version number is incremented and the pointer to the action item can be cleared (by any thread) in order to allow further action items to be installed.

The version number is required since a thread that is in the middle of executing action-items operations may be blocked and it must not be able to perform an outdated operation on the wide object.

As can be seen, any thread may perform any of the actions, on any of the words of the double-word.

Note that if a field is reserved or if the action pointer is set, no other updates to the field may be made until after the action is completed. However, because any thread can complete the action, no thread will ever have to block waiting for another thread to complete it; thus the action item mechanism is lock-free. It means that any algorithm for modifying fields and the action items themselves are prepared to complete any preinstalled actions and clear them prior to proceeding further.

Note that the above example implementation of action items is not limited to acting on two words. It can be used on several words, even when non-consecutive in the memory. In particular, the compactor also may use action items for copying fields into the to-space copy. For example, consider that the compactor copies the contents of double-word fields atomically, and then atomically sets their state to copied. Thus, the compactor may desire to use a quad-word CAS on two status fields and two payload fields in the wide object using the action item mechanism. In the absence of a quadword CAS machine operation, an action item may be used to seemingly atomically copy both payload fields to the to-space copy.

The forwarding pointer word will at various points store a forwarding pointer to another 'narrow' object, a wide object pointer, the object state, and potentially the taint count. There are six object states, which can be represented within 3 bits. On a 64-bit system that mandates 8-byte alignment of objects, it is straightforward to store the object state in the low-order bits of the forwarding pointer word, allowing the high-order bits to store the address of an aligned object. On a system that only has 4-byte alignment, only two bits are available, however another bit may be found elsewhere. For example, if the forwarding pointer is next to a vtable pointer, typically the vtable will have one bit available. Alternatively, a word used for storing hash code and monitor data can be utilized. In each of these cases, modifying the object state is to be done by a double-word CAS operation.

The pseudo code for the write and read barriers is set forth below, and corresponds to the flow diagrams of FIGS. 6 and 7, respectively. As can be seen, the write barrier distinguishes various possible states according to the general compactor phase (idle, preparation, and copy), the state of an object O1 (simple, tagged, expanded, and forwarded) and, if O1 is in an expanded state, the status of a field f (inOriginal, inWide, and inCopy). In the idle phase or if the object is not potentially moving, the value is written to the indicated field, possibly using a forwarding pointer to find the correct copy of the object, with the forward function finding the updated copy. If the object is tagged, meaning that it is not expanded, the from-space copy is used in the preparation phase; however, in the copy phase, the activity is moved to the wide object.

In step 616, the state is changed to expanded and simultaneously the pointer to the wide object is installed. After moving the focus to the wide object, the write-barrier is rerun to avoid races. This rerun can only happen once per moved object. When the object's wide copy is active, the status of the field f is checked to see to where the current value should be written. Some copying into the wide object is also performed if necessary for this field. Note that a write is not allowed to fail, so if the value is atomically written into the wide object and the CAS fails (due to status change, or value change by other threads) then the write is retried until successful. Note that this means the algorithm is only lock-free, but not necessarily wait-free.

Figure 6:
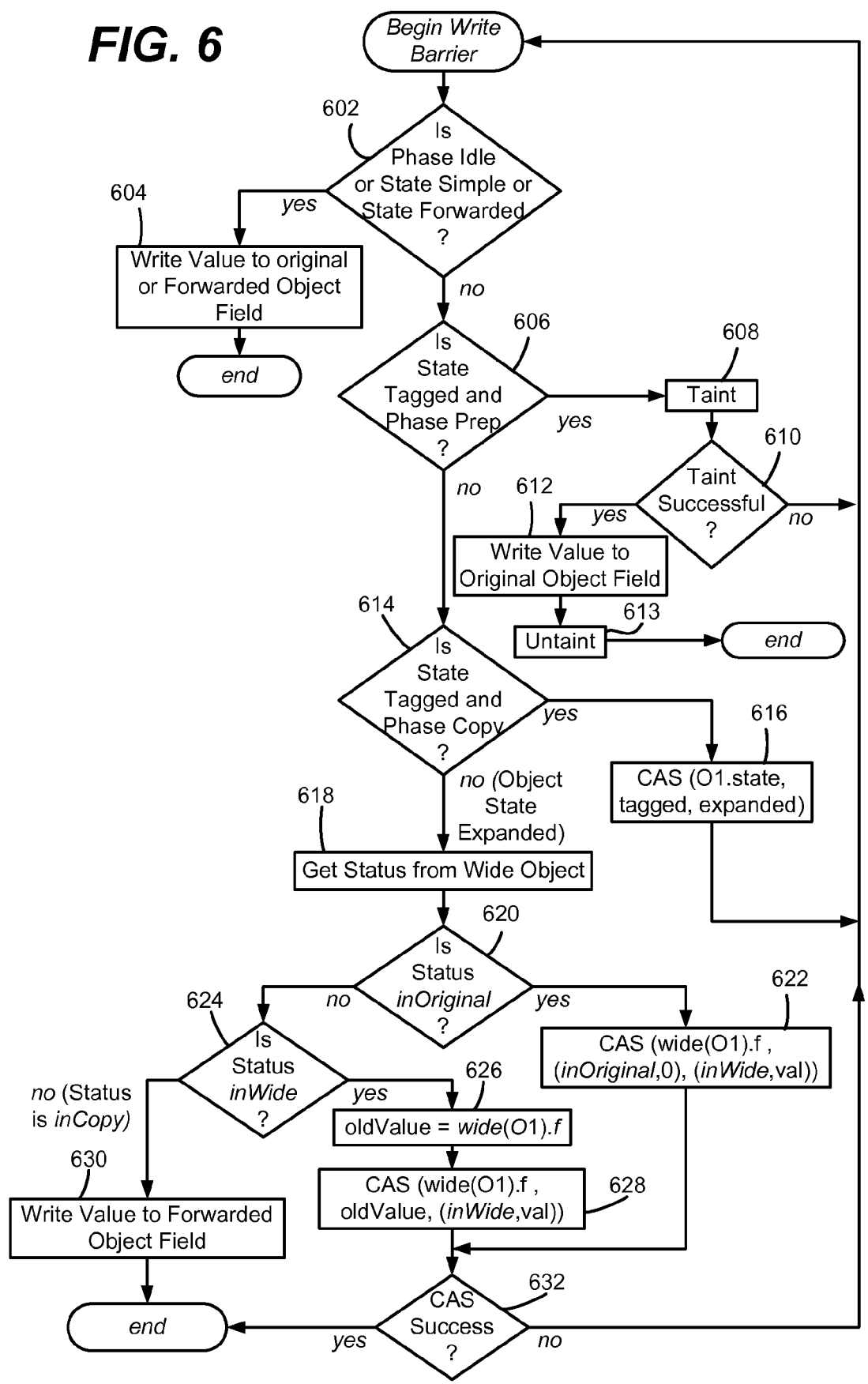
FIG. 6 is a flow diagram representing example steps performed when writing an object field, depending on current operational phase and current state data.

```
/* Write Barrier; example steps correspond to FIG. 6 */
/* Executing a write of O1.f ← val.) */
if (Phase == idle) or (O1.state == simple) or (O1.state ==
    forwarded) then /* step 602 */
    forward(O1).f = val /* step 604 */
else if (O1.state == tagged) and (Phase == prep) then
                            /* step 606 */
    taint (O1) /* step 608 */
    if (Taint unsuccessful) then /* step 610 */
        Start write barrier for O1.f ← val from scratch
    end if
    O1.f = val /* step 612 */
    untaint(O1) /* step 613 */
else if (O1.state == tagged) and (phase == copy) then
    /* step 614; Tagged means no wide O1 yet exists */
    CAS (O1.state, tagged, expanded) /* step 616 */
    Start write barrier for "O1.f ← val" from scratch
else if (O1.state = expanded) then
    status ← status of field f in O1 /* step 618 */
    if (status is inOriginal) then /* step 620 */
        CAS (wide(O1).f , (inOriginal,0), (inWide,val))
    /* step 622 */
        if (CAS unsuccessful) then /* step 632 */
            Start write barrier for "O1.f ← val" from scratch
        end if
    else if (status is inWide) then /* step 624 */
        oldValue = wide(O1).f
        /* step 626 * Read wide (value & status)*/
        CAS (wide(O1).f , oldValue, (inWide,val))
        /* step 628 */
        if (CAS unsuccessful) then /* step 632 */
            Start write barrier for O1.f ← val from scratch
        end if
    else if (status is inCopy) then
        forward(O1).f = val /* step 630 */
    end if
end if
```

The CAS-barrier is very similar to the write-barrier, except that CAS operations are used instead of writes. A CAS may return failure, so the mechanism does not need to retry if the value was modified as the CAS was being performed. The only substantive difference is that in the copy phase, when the field status is inOriginal, the old value of the field (in the original object) is actually loaded and a compare is done with the old value specified by the CAS operation. If that comparison fails, then the CAS fails as well.

The read-barrier code is set forth below, and also represented in FIG. 7. As can be seen, if the field is not in the wide (expanded) object, then the original or to-space object field should be read. In the wide mode, the field status indicates where the data is, that is, which data field contains the current version of the data.

Figure 7:
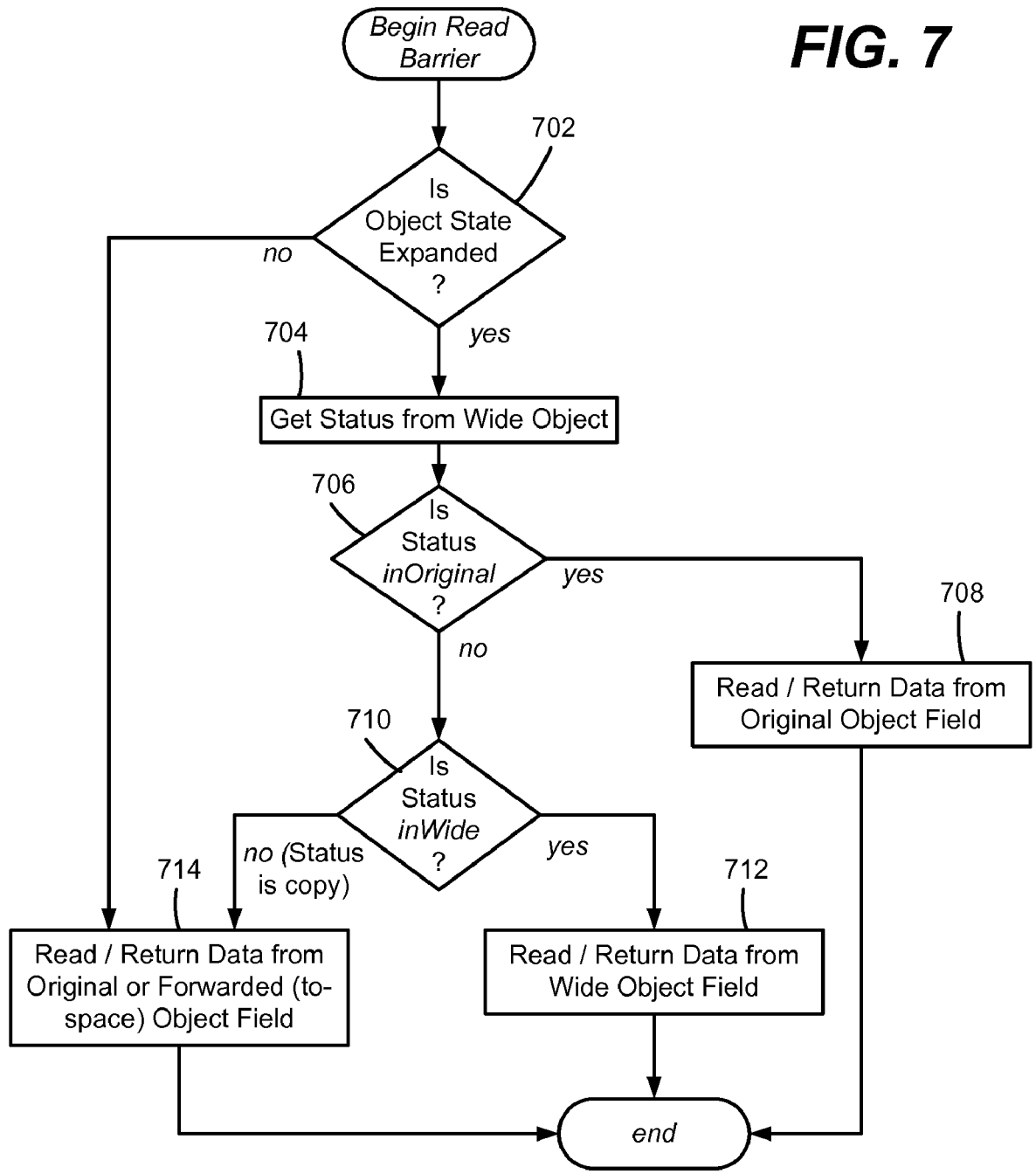
FIG. 7 is a flow diagram representing example steps performed when reading an object field, depending on current state data.

```
/* Read Barrier example steps correspond to FIG. 7 */
if (O1.state = expanded) then /* step 702 */
    status ← status of field f in O1 /* step 704 */
    if (status is inOriginal) then /* step 706 */
        return O1.f /* step 708 */
    else if (status is inWide) then /* step 710 */
        return wide(O1).f
        /* step 712 return value (no status) */
    else if (status is inCopy) then
        return forward(O1).f /* step 714 */
    end if
else
    return forward(O1).f /* step 714 */
end if
```

To make the compactor run both concurrently and in parallel, the copier may use several threads. In this case, the distribution of work is straightforward, because each object can be dealt with separately; coarser or finer distribution granularity may be used. Because the copying threads never race on handling the same fields, no difficult racing issues arise.

Exemplary Operating Environment

Figure 8:
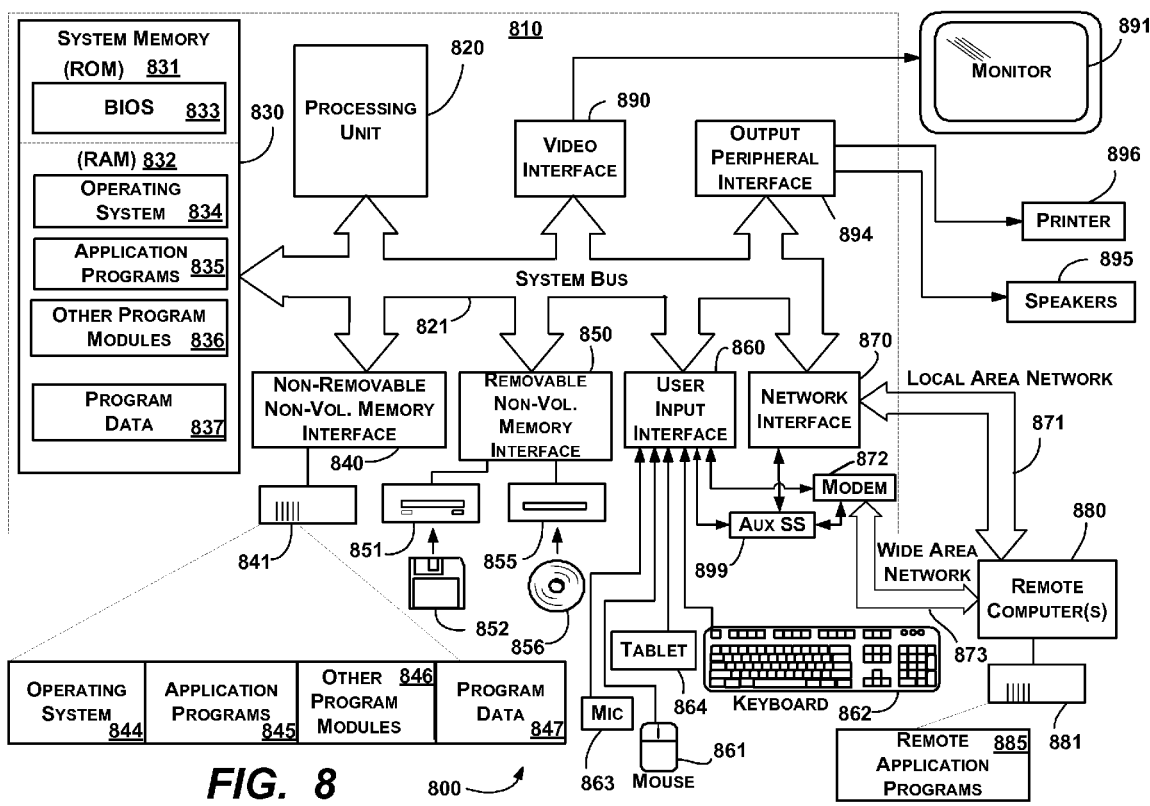
FIG. 8 shows an illustrative example of a general-purpose network computing environment into which various aspects of the present invention may be incorporated.

FIG. 8 illustrates an example of a suitable computing system environment 800 on which the examples represented in FIGS. 1-4 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method of incrementally copying an object from a source set of memory locations to a destination set of memory locations, the method comprising:
    adding, to the object, a first forwarding pointer referencing an interim object copy of the object, the interim object copy comprising at least one interim object data field and at least one status field corresponding to the at least one interim object data field;
    writing data representing the object to the at least one interim object data field and updating a status value of the at least one status field to indicate that the interim object copy contains a current version of the data;
    adding, to the interim object copy, a second forwarding pointer referencing a final object copy of the object;
    writing the data to at least one final object data field of the final object copy and updating the status value to indicate that the data has been written to the final object copy; and
    redirecting the first forwarding pointer to reference the final object copy to render the interim object copy unreachable.

2. The method of claim 1 further comprising providing a third set of memory locations for containing at least part of the data representing the object.

3. The method of claim 1 further comprising providing a mechanism for a mutator thread to access and modify the object in a partially copied state or to read the object in the partially copied state.

4. The method of claim 3 wherein providing the mechanism for the mutator thread to access and modify the object in the partially copied state includes modifying the object via a compare-and-swap operation or by a double-word atomic operation, or by the compare-and-swap operation and the double-word atomic operation.

5. The method of claim 1, further comprising accessing the at least one status field to determine whether the interim object data field contains the current version of the data.

6. The method of claim 1, wherein updating the status value to indicate that the data has been written to the final object copy comprises using an atomic operation to update the status value while ensuring that the data has not been overwritten since being written to the at least one final object data field.

7. A computer-readable storage medium having computer executable instructions, which when executed perform steps, comprising:
- copying, via a thread, an original data field of an original object version while allowing at least one other thread read access to at least one of: the original object version, an interim object version of the original object version, or a final object version of the original object version, the copying comprising at least one of:
  - writing data of the original data field to an interim data field of the interim object version and simultaneously updating a status value of a status field indicator of the interim object version to indicate that a current version of the data is contained in the interim data field; or
  - writing the data to a final data field of the final object version and simultaneously updating the status value to indicate that the current version of the data is contained in the final data field.

8. The computer-readable storage medium of claim 7, the steps further comprising, in response to an action item, sequentially writing a double-word to two separate interim data fields of the interim object version while not allowing any other changes to the two separate interim data fields prior to completion of one or more updates specified in the action item.

9. A computer-readable storage medium having computer executable instructions, which when executed perform steps, comprising:
- creating, from an original object, a final object version and an interim object version, wherein the interim object version includes at least one status field indicator;
- incrementally copying individual fields of the original object, the incrementally copying comprising writing data of the individual fields to at least one interim field of the interim object version and simultaneously updating the at least one status field indicator to indicate that a current version of the data is contained in the at least one interim field; and
- concurrent with said incrementally copying, allowing one or more mutator threads to access and modify the original object.

10. The computer-readable storage medium of claim 9, the incrementally copying further comprising writing the data to at least one final field of the final object version and simultaneously updating the at least one status field indicator to indicate that the current version of the data is contained in the at least one final field.

* * * * *